Figure 1:
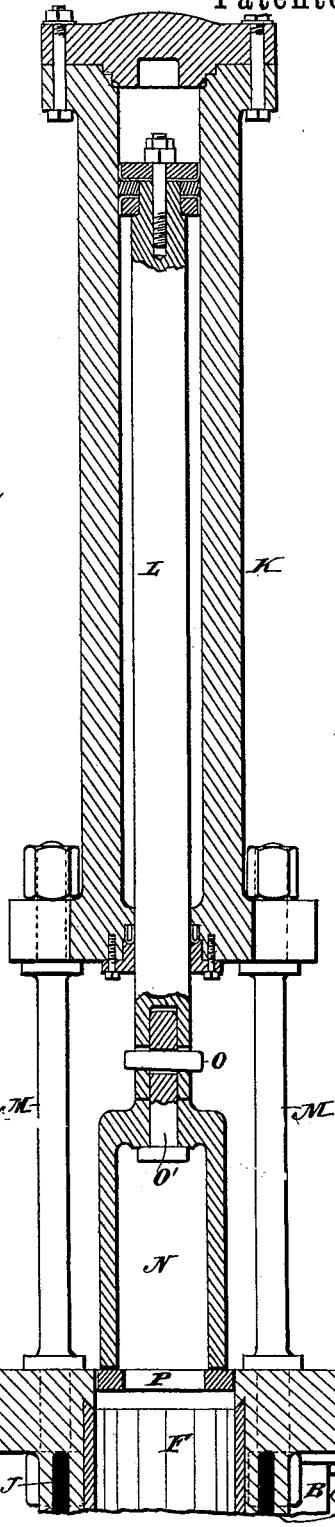

(No Model.) 3 Sheets—Sheet 1.
J. B. EDSON.
PROCESS OF AND APPARATUS FOR MOUNTING PYROXYLINE OR
ANALOGOUS SUBSTANCES UPON A MANDREL.

No. 350,049. Patented Sept. 28, 1886.

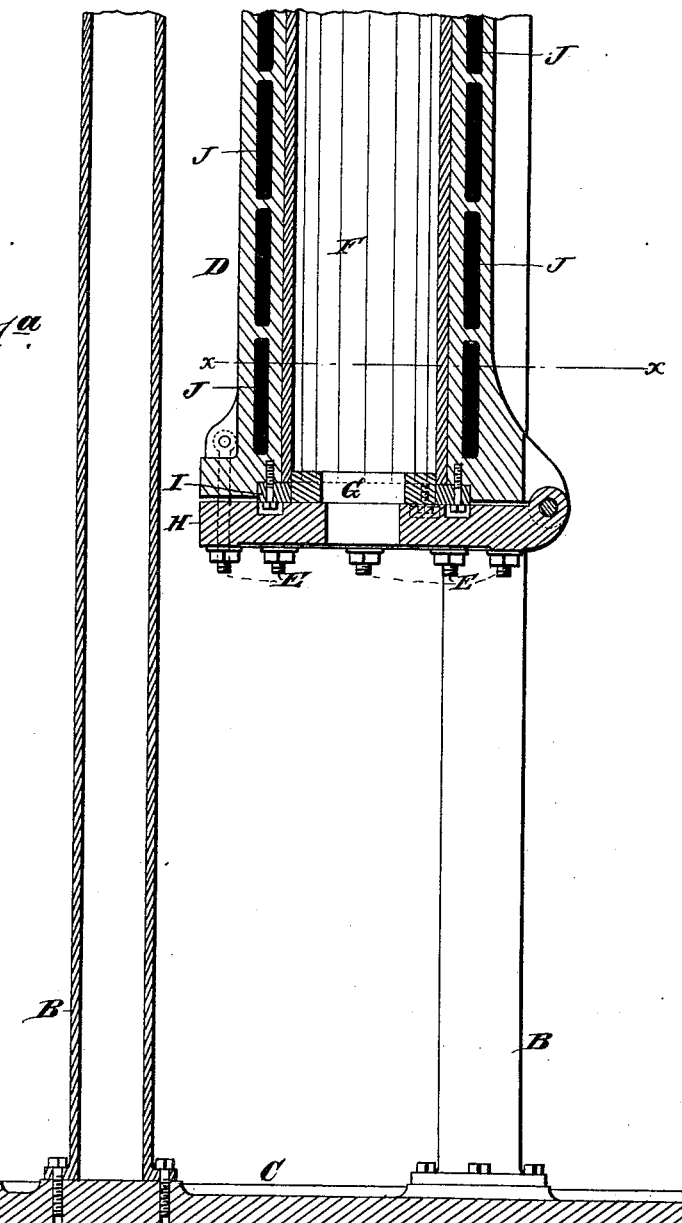

(No Model.) 3 Sheets—Sheet 3.
J. B. EDSON.
PROCESS OF AND APPARATUS FOR MOUNTING PYROXYLINE OR ANALOGOUS SUBSTANCES UPON A MANDREL.
No. 350,049. Patented Sept. 28, 1886.
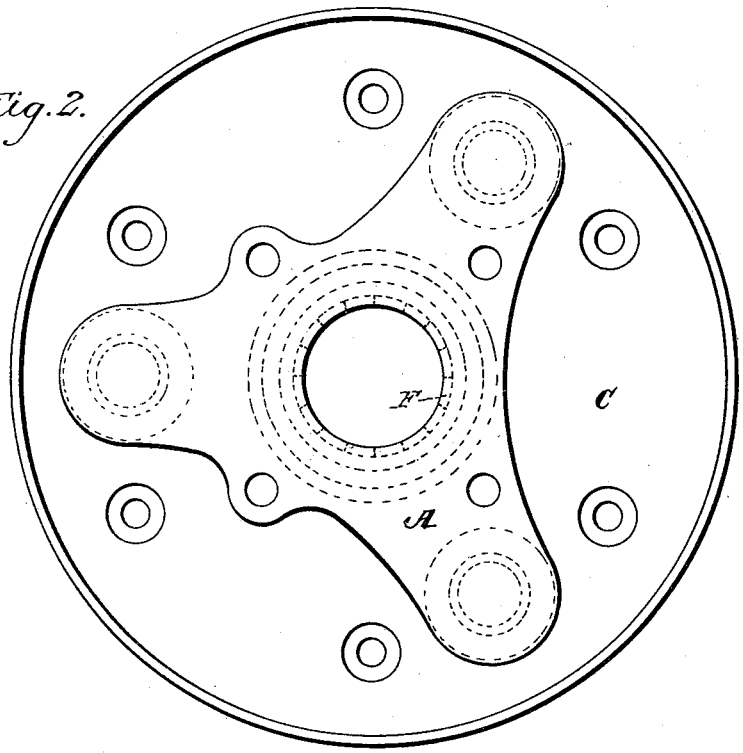
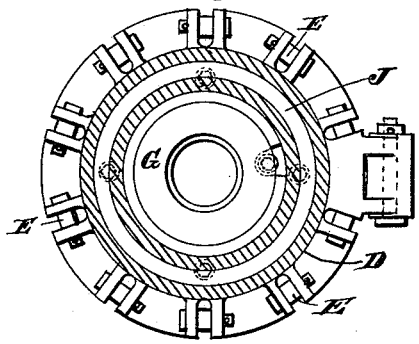
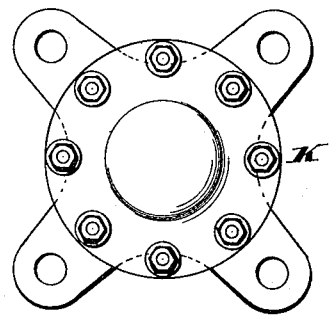
Witnesses.
Robert Everett,
Dennis Sumby.
Inventor:
Jarvis B. Edson,
By James L. Norris.
Atty.

UNITED STATES PATENT OFFICE.

JARVIS B. EDSON, OF BROOKLYN, ASSIGNOR TO THE AMERICAN ZYLONITE COMPANY, OF NEW YORK, N. Y.

PROCESS OF AND APPARATUS FOR MOUNTING PYROXYLINE OR ANALOGOUS SUBSTANCES UPON A MANDREL.

SPECIFICATION forming part of Letters Patent No. 350,049, dated September 28, 1886.

Application filed January 30, 1886. Serial No. 190,356. (No model.)

*To all whom it may concern:*

Be it known that I, JARVIS B. EDSON, a citizen of the United States, residing at Brooklyn, in the county of Kings and State of New York, have invented new and useful Improvements in Processes of and Apparatus for Mounting Pyroxyline or Analogous Substances upon a Mandrel, of which the following is a specification.

This invention has for its object the amassing or consolidation of a mass of pyroxyline or other analogous plastic composition upon a mandrel preparatory to subsequent manipulation thereof; and the invention consists in means, hereinafter described and claimed, whereby the results mentioned are more easily obtained than has heretofore been possible.

In the accompanying drawings, illustrating my invention, Figures 1 and 1ª, taken together, show a vertical central sectional view of an apparatus constructed in accordance with my invention; Fig. 2, a top plan view of the cylinder or mold, the hydraulic ram and its supports being omitted; Fig. 3, a sectional view on the line *x x* of Fig. 1ª, and Fig. 4 a top plan view of Fig. 1.

The apparatus comprises, essentially, two elements, the material cylinder or mold closed at one end with a removable cover, and a hydraulic cylinder and ram, the latter being so located as to freely enter the open end of the cylinder or mold and capable of exerting pressure therein. This hydraulic cylinder and ram has a length a trifle greater than the molding-cylinder, the object of which is to eject the mandrel and contents after the molding operation has been completed, which is done by uncovering the opening at the opposite end of the mold.

The letter A indicates the head of the hydraulic press and material-cylinder sustained by the pillars or posts B, which are bolted to the base-plate C.

To the head A is attached the dependent metal cylinder D, jacketed for a heating or cooling agent, and preferably in subdivisions of two or more separate cored spaces. This cylinder D has a door at its lower end susceptible of being opened or closed and secured in a tight manner, and capable of resisting the enormous thrust it is called upon to sustain during the molding operation. The letters E indicate bolts for securing this cover, preferably made as eyebolts, and the cover is preferably slotted, as shown, to facilitate the introduction of these bolts without removing the nuts therefrom. This cylinder D is provided with an interior metal lining, F, throughout its interior surface, the object of which is to enable the molded contents of the cylinder to be more easily expelled therefrom. This lining F may be subdivided, for the reason that it firmly adheres to the plastic material being molded, while it very readily slides or yields along the line of its exterior contact-surface with the interior surface of the mold D. This metal lining F may be made quite thin and in one or two pieces, and the joints made to nicely abut without seriously interfering with their proper operation, and they can be readily, with care, stripped off the molded contents of the cylinder without so injuring their shape as to prevent their being used over and over again. A form of lining which I prefer, however, is to make it in a number of stave-like pieces of greater thickness than previously described.

The lining F is shown in Fig. 1 to be subdivided into sixteen pieces like staves. It is obvious that by making the staves a trifle thicker at the lower end than at the upper, and by coring out the metal cylinder to a larger diameter at its lower end than at its upper to correspond with the difference made in the thickness of the staves at their lower ends from what they possess at their upper ends they can be much more easily expelled than if of uniform thickness throughout their length. The internal diameter of the bore of these staves, when all in place, is preferably fourteen inches throughout their length, while the exterior diameter of them at the top is preferably sixteen inches, and at the bottom sixteen and one-quarter inches, (giving one-eighth of an inch taper at either side,) in order to provide for the easy ejectment of the mandrel and contents.

G indicates a ring placed within the lining of the cylinder to fit nicely therein at its lower end, and is provided with an opening in its center to act as a step for the lower end of the mandrel.

H indicates the door or cover for the lower end of the material-cylinder, which is also provided with the hole for the reception of the lower end of the mandrel; and I indicates an annular ring fitting in a recess in the lower end of the molding-cylinder D, around the ring G, its purpose being to hold the staves F in position.

The letters J indicate four of the jackets, provided in the usual manner with valves and pipes for the heating and cooling agents surrounding the material-cylinder, and may be connected or be independent; but I prefer that they be subdivided, as it enables the application of heat to one portion of the cylinder in advance of another portion when occasion requires.

K indicates an ordinary hydraulic cylinder, and L the ram thereof, constructed to form a part of the apparatus just described, and attached to the head A by the rods M. This hydraulic cylinder is provided with the usual inlets and outlets for water under pressure, the end of the ram being forced out or withdrawn, according to requirements. The function of this ram is twofold; the first is to act as a compressing agent for consolidating and molding a plastic material upon a mandrel within the cylinder D; the second is, after having so molded the material, to cause the ejection through the opening at the lower end of the cylinder.

N indicates a cup-shaped attachment to the ram of the hydraulic cylinder, made hollow or recessed, so as to surround the neck or projecting portion of the mandrel, which is generally made longer than the mold. This cup-shaped end N of the ram is detachably secured in place by a bolt, O', having a head, and a key or wedge, O, passed transversely through the ram proper and the shank of the bolt.

P indicates an annular ring intended to bear immediately upon the plastic contents and fit loosely within the lining of the cylinder D.

The mandrel to be covered being inserted into the cylinder D and the ring G and the cover H secured in place, the cylinder is filled with the plastic material previously reduced to predetermined dimensions, as described by me in a separate application for patent filed of even date herewith. When the cylinder has been sufficiently filled with the rings or disks of plastic substance, the annulus or ring P is inserted on top of them and the ram is lowered to bring the cup-shaped attachment down on them with great pressure. Heat is then applied, preferably at the lower end of the cylinder, although it may be applied simultaneously in all of the jackets, if there are more than one, and when the heat and pressure have been sufficiently maintained to consolidate all of these rings in one mass a cooling agent is substituted for the heating agent. When the material is sufficiently cooled, the cover or door H is opened, the ring I is removed and pressure applied to the hydraulic ram, thereby ejecting the mandrel and contents, together with the staves F and ring G, after which the staves can be easily removed one by one from contact with the plastic material, to which they adhere somewhat firmly.

Having thus described my invention, what I claim is—

1. The combination of the jacketed cylinder D with a removable internal lining, F, the door H, and the hydraulic cylinder and ram K L, connected with the cylinder and forming part thereof, substantially as described.

2. In a hydraulic molding apparatus provided with a heating and cooling agent and an ejecting-ram, the combination, with a molding-cylinder, of an internal lining to facilitate the ejecting of the contents of said mold, said lining being composed of a number of stave like pieces, F, to facilitate their removal from the molded mass after it has been removed from the cylinder, substantially as described.

3. A molding device consisting of a cylinder capable of being heated and cooled, a ram for the consolidation of its contents, and an internal lining composed of more than one part and preferably made tapering toward the discharge end, substantially as described.

4. The process of affixing a mass of previously-formed plastic composition upon a mandrel by heat and pressure, consisting in inserting said mandrel within a molding-cylinder provided with a removable multipart lining, either tapering or straight, to facilitate the removal of said mandrel and contents, together with said multipart lining, and subsequently detaching said lining from the material on the mandrel, substantially as described.

In testimony whereof I affix my signature in presence of two witnesses.

JARVIS B. EDSON.

Witnesses:
 GUSTAV KEHR,
 J. I. KRAEUTH.